(12) United States Patent  
Puppin

(10) Patent No.: US 9,430,776 B2  
(45) Date of Patent: Aug. 30, 2016

(54) CUSTOMIZED E-BOOKS

(71) Applicant: Diego Puppin, Arlington, MA (US)

(72) Inventor: Diego Puppin, Arlington, MA (US)

(73) Assignee: Google Inc., Mountain View, CA (US)

( * ) Notice: Subject to any disclaimer, the term of this patent is extended or adjusted under 35 U.S.C. 154(b) by 372 days.

(21) Appl. No.: 13/660,136

(22) Filed: Oct. 25, 2012

(65) Prior Publication Data

US 2014/0122990 A1    May 1, 2014

(51) Int. Cl.

| | |
|---|---|
| *G06F 17/00* | (2006.01) |
| *G06Q 30/02* | (2012.01) |
| *G06F 17/21* | (2006.01) |
| *G06F 17/22* | (2006.01) |

(52) U.S. Cl.
CPC ......... *G06Q 30/0201* (2013.01); *G06F 17/218* (2013.01); *G06F 17/2229* (2013.01)

(58) Field of Classification Search
CPC .......................................... G06F 17/20–17/289
See application file for complete search history.

(56) References Cited

U.S. PATENT DOCUMENTS

| | | |
|---|---|---|
| 5,451,163 A | 9/1995 | Black |
| 5,535,422 A | 7/1996 | Chiang et al. |
| 5,920,838 A | 7/1999 | Mostow et al. |
| 6,224,384 B1 | 5/2001 | Jenkins et al. |
| 6,305,942 B1 | 10/2001 | Block et al. |
| 6,334,776 B1 | 1/2002 | Jenkins et al. |
| 6,438,515 B1 | 8/2002 | Crawford et al. |
| 6,544,039 B2 | 4/2003 | Fiedorowicz et al. |
| 6,827,578 B2 | 12/2004 | Krebs et al. |
| 6,882,825 B2 | 4/2005 | Hopkins et al. |
| 7,386,453 B2 | 6/2008 | Polanyi et al. |
| 7,669,111 B1 | 2/2010 | Krause et al. |
| 7,899,674 B1 | 3/2011 | Rubin |
| 8,083,523 B2 | 12/2011 | De Ley et al. |
| 8,137,106 B2 | 3/2012 | De Ley et al. |

(Continued)

FOREIGN PATENT DOCUMENTS

| | | |
|---|---|---|
| JP | 2009-252060 A | 10/2009 |
| JP | 2012-190476 A | 10/2012 |

(Continued)

OTHER PUBLICATIONS

Microsoft, "Use hidden text in Microsoft Office Word 2007," 2013, 2 pages [online] [retrieved on Feb. 6, 2013] Retrieved from the internet <URL:www.microsoft.com/education/en-us/teachers/how-to/Pages/hidden-text.aspx>.

(Continued)

*Primary Examiner* — Keith Bloomquist  
(74) *Attorney, Agent, or Firm* — Fenwick & West LLP

(57) ABSTRACT

An e-book management system receives a request for an e-book from a user client operated by a user. The e-book management system accesses a user profile associated with the user and an e-book profile associated with the e-book. The e-book profile contains content sections referencing portions of the e-book, and containing information describing the characteristics of those portions. Based on the user profile, display settings for the e-book are generated. The display settings contain instructions describing how to transform the e-book based on the content sections. The display settings may be used by the e-book management system to transform the e-book, which can then be sent to the user client. Alternatively, the display settings may be sent to the user client, where they may be used to transform the e-book prior to display.

11 Claims, 4 Drawing Sheets

(56) References Cited

U.S. PATENT DOCUMENTS

| | | | |
|---|---|---|---|
| 8,155,950 | B1 | 4/2012 | Bickerstaff |
| 8,166,418 | B2 | 4/2012 | Williams |
| 8,260,915 | B1 | 9/2012 | Ashear |
| 8,744,855 | B1 | 6/2014 | Rausch |
| 9,009,028 | B2 | 4/2015 | Puppin |
| 2002/0106617 | A1 | 8/2002 | Hersh |
| 2002/0147782 | A1* | 10/2002 | Dimitrova et al. ........... 709/207 |
| 2002/0169822 | A1 | 11/2002 | Packard et al. |
| 2002/0188583 | A1* | 12/2002 | Rukavina et al. ............. 706/45 |
| 2002/0199166 | A1 | 12/2002 | Volcani et al. |
| 2003/0152894 | A1 | 8/2003 | Townshend |
| 2004/0161734 | A1 | 8/2004 | Knutson |
| 2005/0026131 | A1 | 2/2005 | Elzinga et al. |
| 2005/0120303 | A1 | 6/2005 | Behbehani |
| 2006/0127871 | A1 | 6/2006 | Grayson |
| 2006/0161511 | A1* | 7/2006 | Berstis et al. ..................... 707/1 |
| 2006/0282778 | A1 | 12/2006 | Barness et al. |
| 2007/0048696 | A1 | 3/2007 | Blank |
| 2007/0224586 | A1 | 9/2007 | Massie et al. |
| 2008/0222552 | A1* | 9/2008 | Batarseh et al. ............. 715/776 |
| 2008/0243805 | A1 | 10/2008 | Gutta et al. |
| 2009/0106789 | A1 | 4/2009 | Lee et al. |
| 2011/0251837 | A1 | 10/2011 | Conboy et al. |
| 2012/0077155 | A1 | 3/2012 | Siani |
| 2014/0052434 | A1* | 2/2014 | Bank et al. ....................... 704/2 |

FOREIGN PATENT DOCUMENTS

| | | |
|---|---|---|
| KR | 10-2000-0060515 A | 10/2000 |
| WO | WO 2011/151709 A2 | 12/2011 |
| WO | WO 2012/032535 A1 | 3/2012 |
| WO | WO 2012/0115756 A2 | 8/2012 |

OTHER PUBLICATIONS

Merriam-Webster, "Word of the Year 2011," Dec. 15, 2011, 2 pages, [online] [retrieved on Feb. 6, 2013] Retrieved from the internet <URL:www.merriam-webster.com/info/2011words.htm>.

Dedhia, S., "Hide & Show Section or Paragraphs in Microsoft Word Documents with More Add-in," Blogs DNA, Sep. 15, 2010, 4 pages [online] [retrieved on Feb. 6, 2013] Retrieved from the internet <URL:www.blogsdna.com/12333/hide-show-sections-or-paragraphs-in-microsoft-word-documents-with-more-add-in.htm>.

Elmaani, A., "Summarize Articles, Editorials and Essays Automatically," 2009-2012, 1 page [online] [retrieved on Feb. 6, 2013] Retrieved from the internet <URL:www.smmry.com>.

Google Inc., "Trends" 2013, 1 page [online] [retrieved on Feb. 6, 2013] Retrieved from the internet <URL: www.google.com/trends/>.

Renouf, A., et al., "A System of Automatic Textual Abridgement," CiteSeer, 13 pages [online] [retrieved on Feb. 25, 2013] Retrieved from the internet <URL: http://www.google.com/url?sa=t&rct=j&q=&esrc=s&source=web&cd=1&ved=0CCcQFjAA&url=http%3A%2F%2Fciteseerx.ist.psu.edu%2Fviewdoc%2Fdownload%3Fdoi%3D10.1.1.159.5838%26rep%3Drep1%26type%3Dpdf&ei=lcgYT5i1Nqne0QG74fzPCw&usg=AFQjCNFEwjGsvyczji9IXEw8r6B05UU-dA>.

PCT International Search Report and Written Opinion for PCT/US2013/073819, Mar. 20, 2014, 9 Pages.

PCT International Search Report and Written Opinion for PCT/US2013/066320, Feb. 14, 2014, 7 Pages.

Bry, F., et al., "Perspectives for electronic books in the World Wide Web age," The Electronic Library, 2002, pp. 1-19, [online] [Retrieved on May 24, 2016] Retrieved from the internet <URL:http://www.en.pms.ifi.lmu.de/publications/PMS-FB/PMS-FB-2002-6.pdf>.

Iksal, S., et al., "Revisiting and Versioning in Virtual Special Reports" In: "Correct System Design", 2002, pp. 264-279, Springer International Publishing.

Kravcik, M., et al., "Requirements and Solutions for Personalized Adaptive Learning", Network of Excellence Professional Learning PROLEARN 2005, Jan. 26, 2005, pp. 1-63, can be retrieved from the internet: URL:https://hal.archives-ouvertes.fr/docs/00/59/09/61/PDF/Kravcik-Prolearn-2005.pdf.

Lops, P., et al., "Content-based Recommender Systems: State of the Art and Trends" Chapter 3, Oct. 5, 2010, pp. 73-105.

Ribiere, M., et al., "The sBook", Proceedings of the Third Workshop on Research Advances in Large Digital Book Repositories and Complementary Media, Booksonline '10, 2010, p. 3.

Extended European Search Report for European Patent Application No. EP 13849328.3, Jun. 2, 2016, 14 Pages.

* cited by examiner

CUSTOMIZED E-BOOKS

BACKGROUND

1. Field of Disclosure

This disclosure relates to the field of text processing generally, and specifically to the generation of custom views for e-books.

2. Description of the Related Art

As tablet computers, smart phones, and e-readers increase in popularity, more and more consumers are using these devices to read longer text content such as magazine articles and e-books. However, the audiences for this text content can come from diverse demographics with different reading needs based on their age, interests, reading ability, and other characteristics. For example, a single work of fiction may appeal to both a twelve-year-old boy and a thirty-year-old man, but certain violent scenes in the book may be inappropriate for the boy, while they may be acceptable for the adult. In the past publishers of physical books have often printed multiple editions of the same book to appeal to different demographics. For instance, airport bookstores often carry abridged editions of classic books to appeal to busy business travelers. These modified editions of printed books are, however, targeted to broad demographic groups and fail to specifically address the diverse requirements of the full spectrum of readers.

SUMMARY

The above and other needs are met by a computer-implemented method, a computer system, and a non-transitory computer-readable storage medium storing executable code for displaying a customized version of an e-book on a user client.

Some implementations of the computer-implemented method for generating displaying a customized version of an e-book on a user client comprise receiving a request for a portion of an e-book from the user client operated by a user and accessing a user profile for the user, where the user profile describes the reading preferences of the user. The method further comprises accessing an e-book profile associated with the e-book, where the e-book profile describes a plurality of content sections associated with portions of the e-book, and where each content section has one or more section attributes describing an associated portion of the e-book. The method also comprises determining e-book display settings for the requested portion of the e-book based on the user profile and the e-book profile, where the e-book display settings comprise instructions indicating how the requested portion of the e-book should be transformed for the user. The method further comprises generating a modified version of the requested portion of the e-book, using the display settings.

Some implementations of a non-transitory computer-readable storage medium storing executable computer program instructions for displaying a customized version of an e-book on a user client comprise instructions that when executed perform steps for receiving a request for a portion of an e-book from the user client operated by a user and accessing a user profile for the user, where the user profile describes the reading preferences of the user. The storage medium also comprises instructions for accessing an e-book profile associated with the e-book, where the e-book profile describes a plurality of content sections associated with portions of the e-book, and where each content section has one or more section attributes describing an associated portion of the e-book. The storage medium also stores instructions for determining e-book display settings for the requested portion of the e-book based on the user profile and the e-book profile, where the e-book display settings comprise instructions indicating how the requested portion of the e-book should be transformed for the user. The storage medium further comprises instructions for generating a modified version of the requested portion of the e-book, using the display settings.

Some implementations of a computer system for displaying a customized version of an e-book on a user client comprise a processor for executing computer program instructions and a non-transitory computer-readable storage medium storing executable computer program instructions for receiving a request for a portion of an e-book from the user client operated by a user and accessing a user profile for the user, where the user profile describes the reading preferences of the user. The storage medium also stores instructions for accessing an e-book profile associated with the e-book, where the e-book profile describes a plurality of content sections associated with portions of the e-book, and where each content section has one or more section attributes describing an associated portion of the e-book. The storage medium further comprises instructions for determining e-book display settings for the requested portion of the e-book based on the user profile and the e-book profile, where the e-book display settings comprise instructions indicating how the requested portion of the e-book should be transformed for the user. The storage medium also comprises instructions for generating a modified version of the requested portion of the e-book, using the display settings.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
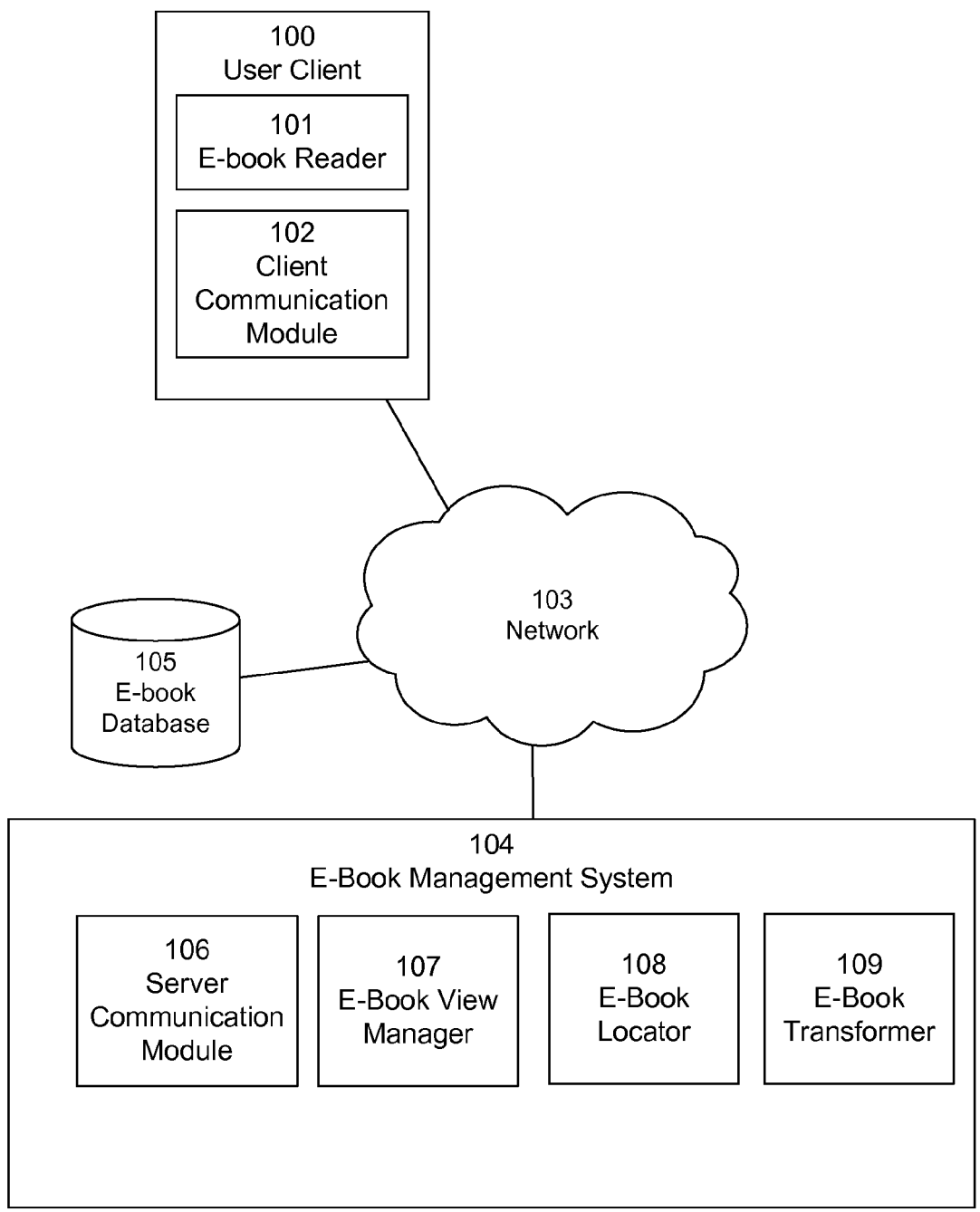
FIG. 1 is a high-level block diagram illustrating an embodiment of an e-book management system connected by a network to a user client and an e-book database.

FIG. 1 is a high-level block diagram illustrating an embodiment of an e-book management system (EMS) 104 connected by a network 103 to a user client 100 and an e-book database 105. The user clients 100 are computing devices that can execute software. A user client 100 might be, for example, a personal computer, a personal digital assistant, a smart phone, a laptop computer, an e-reader, or other type of network-capable device such as a networked television or set-top box. The user client 100 comprises an e-book reader 101 and a client communication module 102.

The e-book reader 101 is a module that enables a user operating the user client 100 to request a portion of an e-book (which could be the entire e-book), and to view the requested portion of the e-book once it has been downloaded. For example, the user operating the user client 100 may select an e-book to read from a list of e-book choices displayed via the e-book reader 101, and the e-book reader 101 will send a request for the selected e-book to the EMS 104. Requested e-books may be downloaded from the EMS 104 or from a separate e-book database 105.

The e-book reader 101 is configured to display e-books and/or to modify the display of e-books based on display settings received from the EMS 104. The display settings are instructions that describe how to hide, highlight, re-order, resize, substitute, or otherwise transform the content of the e-book. These transformations allow the e-book reader 101 to satisfy the requirements or preferences of the user operating the user client 100 by displaying a transformed e-book. In one embodiment the display settings may be received by the user client 100 as part of a requested e-book, and the e-book reader 101 uses the settings to transform the e-book on the user client 100. For example, if the user is a minor, the display settings may instruct the e-book reader 101 to hide sections of the e-book that contain excessively violent content. Similarly, if the e-book is a long novel, and the user is a busy adult, the display settings may instruct the e-book reader to hide sections of the novel that are considered boring or unnecessary to the main plot. In another embodiment, the display settings are used by the EMS 104 to transform an e-book, and the transformed e-book is sent to the user client 100 for display.

The e-book reader 101 may also be configured to allow the user to provide input to express a preference for or against particular sections of content within the e-book, or for or against the e-book in its entirety. Similarly, the e-book reader 101 may enable a user to flag portions of an e-book for inappropriate content, violent content, sexual content, etc.

The e-book reader 101 may also collect data on the user's reading behavior and habits, as well as their actions and interactions with the e-book reader 101. The data collected by the e-book reader 101 may include, for example, the reading speed of a user based on their rate of page turning, information about e-book text that is skipped, highlighted or noted by a user during reading, and information about words that a user looks up in a dictionary.

The client communication module 102 is a module that sends information from the user client 100 to the EMS 104, and receives information from the EMS 104 and the e-book database 105. With the user's permission, the client communication module 102 will communicate the e-book requests and the user data collected by the e-book reader 101 to the EMS 104. The client communication module 102 may also communicate other information related to the user to the EMS 104 such as their preferences for other media (such as music and movies), their demographic information, their social data, their purchase preferences, etc. However, this data will only be sent to the EMS 104 with the user's approval. In one embodiment, if the user does not provide explicit approval, such as by interacting with a button on an approval dialog box displayed on the user client 100, the client communication module 102 will not communicate the user data to the EMS 104.

The client communication module 102 also allows the user operating the user client 100 to log into the EMS 104 by providing a user name and/or password and to establish a user profile with the EMS 104. The client communication module 102 receives data sent from the EMS 104 in response to e-book requests from the user. This data may include a requested portion of an e-book, a transformed portion of an e-book, a location for the requested e-book in the e-book database 105, and display settings for the e-book customized for the user operating the user client 100. If the requested portion of an e-book is not received directly from the EMS 104, the client communication module 102 may retrieve the requested portion from the e-book database 105 based on the e-book location information received from the EMS 104.

The e-book database 105 is an archive that stores e-book information. This information includes the text contents of the e-books. In one embodiment the information in the e-book database is accessed directly by the client communication module 102 executing on the user client 100. In another embodiment the client communication module 102 receives the e-book information via the EMS 104. In one embodiment, the e-book database 105 is a part of the EMS 104. In another embodiment, the e-book database 105 is an archive maintained by a third-party such as an e-book retailer or library.

The network 103 provides a communication infrastructure between the user clients 100 and the EMS 104. The network 103 is typically the Internet, but may be any network, including but not limited to a Local Area Network (LAN), a Metropolitan Area Network (MAN), a Wide Area Network (WAN), a mobile wired or wireless network, a private network, or a virtual private network.

The EMS 104 receives requests for e-books from the user client 100 and sends requested portions of e-books (or locations for downloading this data) to the user client 100. The EMS 104 also sends display settings or a transformed e-book to the user client 100. The EMS 104 comprises a server communication module 106, an e-book view manager 107, an e-book locator 108, and an e-book transformer 109. The server communication module 106 of the EMS 104 receives the e-book request and user data from the client communication module 102 via the network 103. The server communication module 106 also sends the display settings and/or a transformed e-book, once they are determined, to the user client 100.

The e-book view manager 107 determines display settings for the requested e-book based at least in part on the user data. The display settings determine how the requested portion of an e-book will be transformed prior to display to the user. The display settings are personalized for the user operating the user client 100, and enable the e-book reader 101 or the e-book transformer 109 to generate a modified version of the e-book for the user that is tailored to that particular user's preferences and requirements.

The e-book locator 108 determines the location of the e-book requested by the user. In one embodiment the e-book locator 108 retrieves the requested e-book from the e-book database 105. In this embodiment the server communication module 106 then communicates the requested portion of an e-book, with or without transformations, to the user client 100. In another embodiment the e-book locator 108 determines the location of the requested e-book in the e-book database 105, and the server communication module 106 communicates the location of the requested e-book along with the display settings to the user client 100.

The e-book transformer 109 may be used to transform an e-book or a requested portion of an e-book, prior to sending the e-book to the user client 100. The e-book transformer 109 transforms the e-book based on the instructions in the display settings generated for the user by the e-book view manager 107. In one embodiment the e-book transformer 109 is used to transform an e-book requested by the user, before the e-book is sent to the user client 100. In another embodiment the e-book is not transformed by the e-book transformer 109, but instead, the untransformed e-book and the display settings are sent to the user client 100 instead. In the latter embodiment the e-book reader 101 performs the transformations according to the display settings, on the user client 100.

Thus the EMS 104 can provide a user reading an e-book on the user client 100 with a customized reading experience that is based on that user's preferences and information. The customization of e-books on a per-user basis enhances users' experience reading e-books. Although FIG. 1 illustrates only one of each entity in practice there may be a plurality of user clients 100, e-book databases 105, and EMS's 104.

Figure 2:
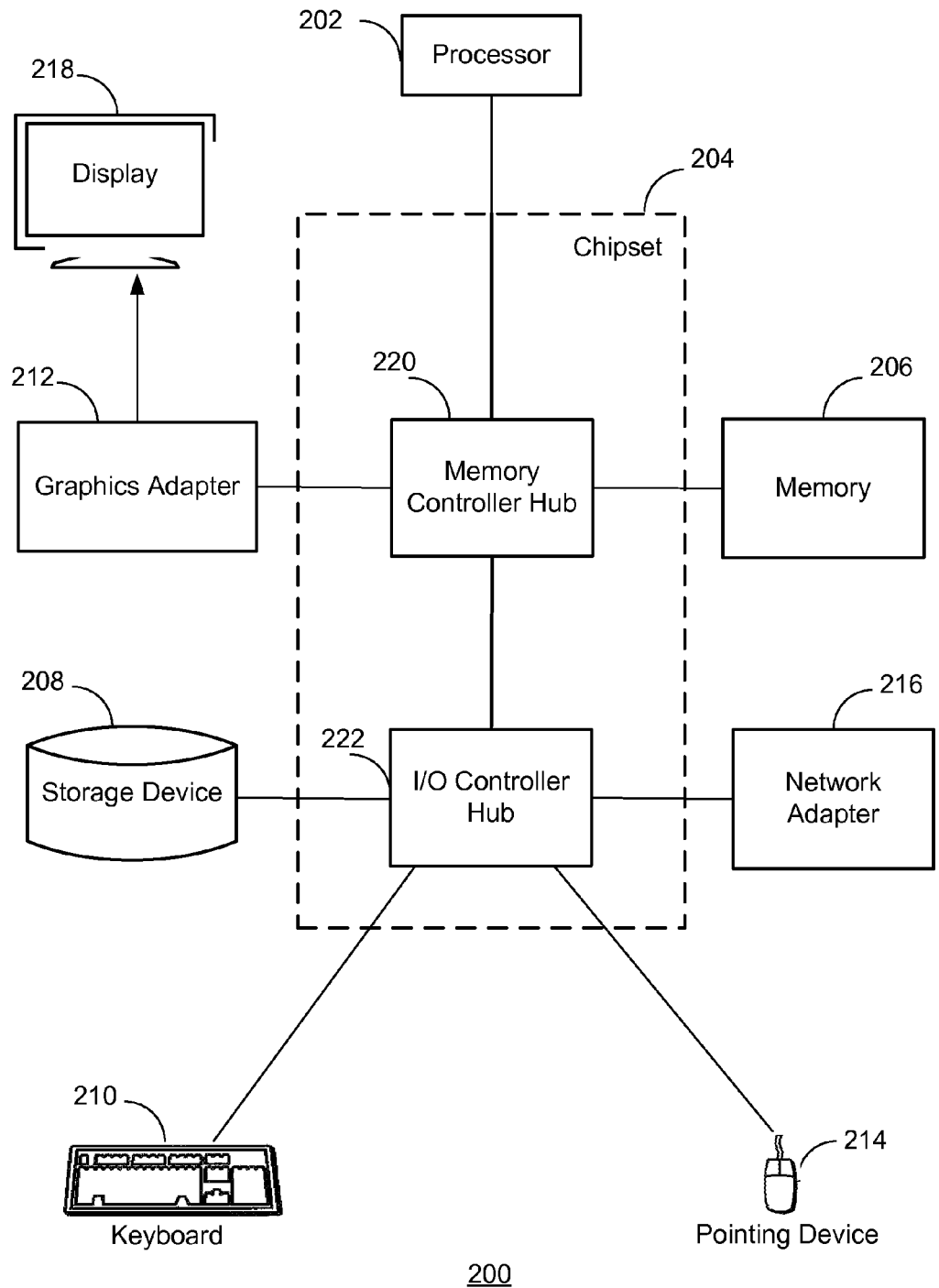
FIG. 2 is a high-level block diagram illustrating an example computer.

The entities shown in FIG. 1 are implemented using one or more computers. FIG. 2 is a high-level block diagram illustrating an example computer 200. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computer 200 have different architectures.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer 200. The graphics adapter 212 displays images and other information on the display 218. The network adapter 216 couples the computer 200 to one or more computer networks.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computers 200 used by the entities of FIG. 1 can vary depending upon the embodiment and the processing power required by the entity. For example, the EMS 104 might comprise multiple blade servers working together to provide the functionality described herein. The computers 200 can lack some of the components described above, such as keyboards 210, graphics adapters 212, and displays 218. For example, the EMS 104 can run in a single computer 200 or multiple computers 200 communicating with each other through a network such as in a server farm.

Figure 3:
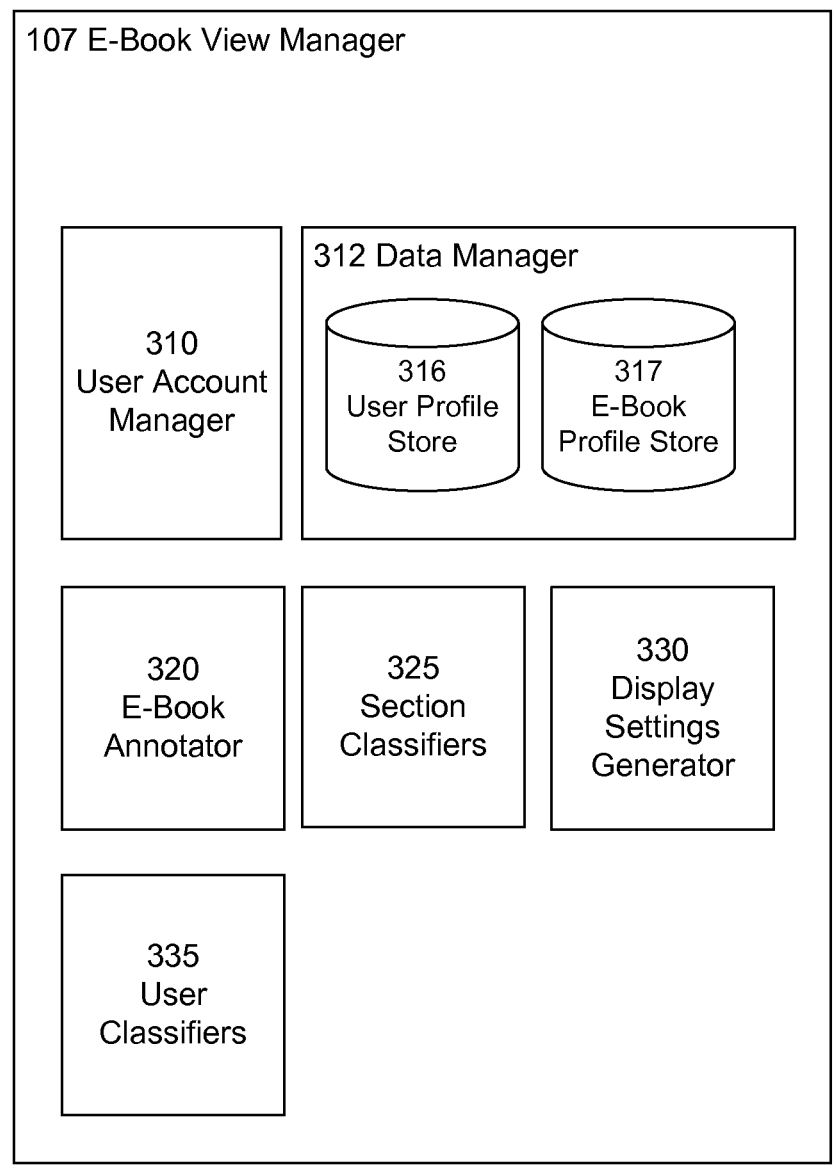
FIG. 3 is a high-level block diagram illustrating a detailed view of modules within an e-book view manager according to one embodiment.

FIG. 3 is a high-level block diagram illustrating a detailed view of modules within the e-book view manager 107 according to one embodiment. Some embodiments of the e-book view manager 107 have different modules than those described here. Similarly, the functions can be distributed among the modules in a different manner than is described here. In addition, each module in FIG. 3 may be implemented by a set of computers operating in parallel to further improve efficiency. The e-book view manager 107 determines display settings for a requested e-book based on user data associated with a user. The e-book view manager 107 comprises a user account manager 310, data manager 312, e-book annotator 320, section classifiers 325, training module 327, display settings generator 330, and user classifiers 335.

The user account manager 310 enables the EMS 104 to identify and authenticate users. The user account manager 310 also enables users to establish new accounts with the EMS 104. Each user may have a distinct account on the EMS 104. The user account manager 310 provides information to the data manager 312 and other components of the EMS 104 that allows collected information to be associated with a particular user through their user account.

The data manager 312 stores and manages the information received from the user clients 100 and other data sources. This information may be used to generate display settings for an e-book displayed to the user. Some of this data may be received as part of user data received from the user clients 100 via the server communication module 106, and other data may be received from separate sources, such as social networks, book retailers, etc. Users may also provide information directly to the EMS 104 when establishing an account through the user account manager 310. For example, a user may provide their real name, address, age, and birthday when signing up for an account with the EMS 104. As mentioned above, users operating user clients 100 may choose to provide no information to the EMS 104, and may withhold permission for data gathering. If a user does not provide permission to the EMS 104 to gather information, the EMS 104 will not retain any user information and will not gather data about that user from third parties. The data manager 312 comprises a user profile store 316 and an e-book profile store 317 in one embodiment.

The user profile store 316 stores user profiles, each containing data related to a single user, and each associated with a user account. The user profile for a user contains the information collected by the data manager 312 for that user, including information received from the user client 100, information directly provided by the user when establishing a user account, and information from other sources. Information stored by the user profile store 316 includes, for example, age, gender, favorite book genres, recent books purchased, reading habits, devices owned, material skipped during reading, reading preferences, content flagged, etc. Each user's profile may also contain references to the profiles of other individuals with whom that user shares a connection (friends, family, co-workers, etc.). Information about these connections may be included in the social networking data of a user received by the data manager 312 from a social networking system.

The e-book profile store 317 stores information related to e-books. The information for each e-book is stored in an e-book profile for that e-book. For a given e-book, the e-book profile may contain an e-book identifier identifying the e-book, the text of the e-book, and additional data related to the e-book. Examples of data stored in an e-book profile include data on genre, publisher, and author; user data such as ratings; and retailer data such as sales numbers, demographics of purchasers, etc.

The e-book profile for an e-book also stores information about content sections for that e-book. The content sections are references to particular portions of the e-book and are used to associate characteristics with different parts of the e-book. The content sections may reference portions of the e-book that are of different sizes and that overlap. For example a content section may reference a single sentence, a single chapter, multiple chapters, a glossary, an appendix, bibliography, a paragraph, a figure, or some other portion of an e-book.

Each content section may include one or more section attributes. The section attributes are descriptive information about a content section. For example, a content section may have section attributes such as "long description", "violent content", "sexual content", "important plot information", "popular section", "figure", "drawing", "example", "problem solution", "question", "exercise", "quotation", "adult content", "footnotes", "bibliographical information", "glossary information", "theorem proofs", "difficult content", "data tables", "appendices", "optional episodes", "side stories", "repetitive content", "unnecessary content", etc. A single content section may have multiple section attributes. For example, a content section may be marked with both the "important plot information" section attribute and the "popular section" attribute. Similarly a single section attribute may be used to represent multiple characteristics. For example, funny and newsworthy content may be represented by a single section attribute "interesting." The section attributes may be represented in binary form that does not correspond to the text description of the characteristic(s) of that attribute. For example, instead of using text tags such as "funny" a section attribute may be represented as a compact bit pattern for the sake of efficiency.

In one implementation, the content sections may be configured so that one or more content sections are mutually exclusive. For example, an e-book text book may have several versions of the same chapter. One version may be an easy version designed for high school students, another version may be designed for college students, and a third version may be written for graduate students. The content sections in this case will have information associated with them to indicate that only one of these sections should be displayed at a given time. This information can take the form of special section attributes, as described above, or it can take another form. When the display settings for a user are determined this mutual exclusivity information can be taken into account to ensure that different versions of the same content section are not displayed to the user.

An e-book profile may also contain information related to the preferences of various users for particular content sections of the e-book. For example, the EMS 104 may receive information from a number of user clients 100 that a particular section of an e-book is skipped by readers. The EMS 104 may store this reader preference data in the e-book profile for that e-book as well as in the user profiles for the readers. The reader preference data in the e-book profile may contain cross references to the user profiles for the specific readers, so that specific skipped content sections can be correlated with the users that skipped them.

The e-book annotator 320 is a module that determines the content sections and their section attributes, for an e-book. In one embodiment this information is stored in the e-book profile for the e-book in the e-book profile store 317. In another embodiment this information is stored in the e-book database 105 along with the e-book data. The e-book annotator 320 may use several different approaches to determine the content sections and section attributes. In one implementation the sections and attributes are determined manually. In this approach human administrators determine one or more content sections based on portions of the e-book and then determine section attributes for these content sections based on the contents of those portions. For example, human administrators may read an e-book and determine paragraphs that are violent, sexual, boring, unnecessary, etc. The administrators may then store references to these paragraphs as content sections in the e-book's profile, with section attributes for each content section based on the characteristics of the paragraphs.

In a different implementation the content sections and section attributes are determined using automated processes. In this approach an e-book is divided into content sections by the e-book annotator 320 based on the structure of the e-book, external references to the e-book, etc. For example, the e-book annotator 320 may automatically determine content sections based on the formatting information in the e-book data, for example, by creating content sections referencing the chapters, paragraphs, glossaries, appendices, figures, etc. The e-book annotator 320 may also use the user reading preference information, collected by the data manager 312 and stored in the user profiles store 316, to determine commonly quoted portions of the e-book, commonly highlighted portions of an e-book, etc., and may create content sections referencing those portions of the e-book. Similarly, the e-book annotator 320 may determine portions of an e-book that are often skipped by particular demographic groups and may create content sections referencing those portions of the e-book.

The e-book annotator 320 may then use section classifiers 325 to label the content sections with section attributes based on their content. The section classifiers 325 are manually configured computer programs or trained machine-learned models that may be used to determine the section attributes that apply to a content section based on both the e-book data as well as information from the user profile store 316, e-book profile store 317, and other information. The section classifiers 325 may use techniques such as natural language processing, machine-learned classification, and sentiment analysis to determine the section attributes that apply to the portions of the e-book referenced by the content sections.

For example, a section classifier may be used to analyze the text associated with a content section of an e-book to determine if that portion of the e-book contains violent content. The section classifier in this case may use natural language processing and machine-learned models to determine whether the language in the content section indicates violent content. In addition, the section classifier may utilize information from the user profile store 316 to assist in determining the section attributes that apply to a content section. For instance, if many users have flagged the text associated with a content section as violent, the section classifier may label the content section with a section attribute indicating "violent content." Similarly, if many users in a particular demographic group have indicated approval for a portion of an e-book, either explicitly through flagging or implicitly through highlighting, sharing, or quoting, a section classifier 325 may label a content section that references that portion of the e-book as popular with that demographic group. For example, a content section may be labeled with a section attribute "popular with teens" or "popular with women 30-40", etc.

In one implementation, the e-book annotator 320 uses a combination of automated and manual methods to generate the content sections and section attributes for an e-book. For example, the e-book annotator 320 may utilize human administrators to determine the content sections and automated methods to determine the section attributes for those content sections, or vice versa. Automated methods and manual methods may also be used in combination for both determining content sections as well as section attributes. In one embodiment, an automated process is used to determine the content sections and section attributes, as described above, followed by a process of manual curation and tuning by human administrators to remove any section attributes that have been erroneously placed on content sections. For instance, a section classifier 325 may be used to label content sections of an e-book with a "violent content" section attribute. Following this a human administrator may read the content sections that have been labeled with the section attribute, and may remove that attribute from content sections that do not contain violent content. In this way errors introduced by an automated system may be corrected.

The display settings generator 330 generates display settings for a user and an e-book, based on the user profile for the user (including the user's reading preference data) and the e-book profile for the e-book that they are reading (including the content section and section attribute information). The display settings for a user and e-book are instructions that tell the e-book reader 101 and/or the e-book transformer 109 how to transform the requested portion of an e-book for that user. The display settings may be represented in different ways.

In one implementation the display settings comprise one or more section transformations each associated with one or more target attributes. The section transformations describe how a content section should be transformed prior to display in the e-book reader 101, and the target attributes describe the section attributes that must be present on a content section before the section transformation will be applied to it. For example, assume that the display settings generator 330 determines that a particular user does not like violent and boring content, but loves quotations and popular content. The display settings for that user reading an e-book novel may comprise a section transformation "hide" associated with target attributes "'violent' and 'boring'"; and another section transformation "highlight" associated with target attributes "'popular' or 'quoted'". Based on these display settings the e-book reader 101 will determine a first set of content sections of the requested portion of the e-book that have both the section attribute "violent" and the section attribute "boring". It will also determine a second set of content sections of the requested portion of the e-book that have either the section attribute "popular" or "quoted". When transforming the requested portion of the e-book, the e-book reader 101 or the e-book transformer 109 will hide the content sections in the first set, and will highlight the content sections in the second set.

In another implementation, the display settings comprise one or more section transformations, as described above, each associated with one or more section references. The section references are references to the content sections of the e-book that the transformations apply to. In this implementation the e-book and display settings do not need to have attribute information as the section transformations are directly associated with the content sections where they apply.

In one implementation the display settings comprise a combination of both attributes and references, with some section transformations associated with target attributes, and other section transformations associated with section references. The display settings may also include instructions to show specific mutually exclusive content sections. Regardless of the implementation details, the display settings enable the preferences of the user to be reflected in the e-book displayed to him or her. The display settings generator 330 may use user classifiers 335 to determine the section transformations, target attributes and/or section references.

The user classifiers 335 are manually configured computer programs or trained machine-learned models that may be used to determine the target attributes/section references and section transformations for a user based on the e-book profile of a requested e-book as well as the user's profile. In one implementation, the user classifiers 335 may use standard machine learning techniques to determine the target attributes that are relevant for a user and the transformations that should be applied to the content sections with those attributes. For example, a user classifier may determine that the target attributes "violent" and "adult content" are relevant for a user based on the fact that the user's profile indicates an age under sixteen. Based on this young age, the user classifier may also determine that the relevant transformation for those target attributes is a "hide" transformation.

Similarly, based on a user's profile information, such as education level, age, etc., instructions may be generated to show one or more mutually exclusive content sections. For example, for a freshman student, advanced graduate level material in a text book may be marked to be hidden, while the undergraduate level material may be marked to be shown.

In addition, the user classifier may utilize information from the e-book profile to determine section references and corresponding transformations that may be relevant for the user. For instance, using the reader preference data stored in the e-book profile, a user classifier may identify sections of the e-book that are popular/unpopular with the social connections of the user. These identified sections may be used to generate the section references, and the section transformations may be determined based on whether each of the sections is popular or unpopular—e.g. the hide transformation may be associated with references to unpopular sections while the highlight transformation may be associated with references to popular sections.

Figure 4:
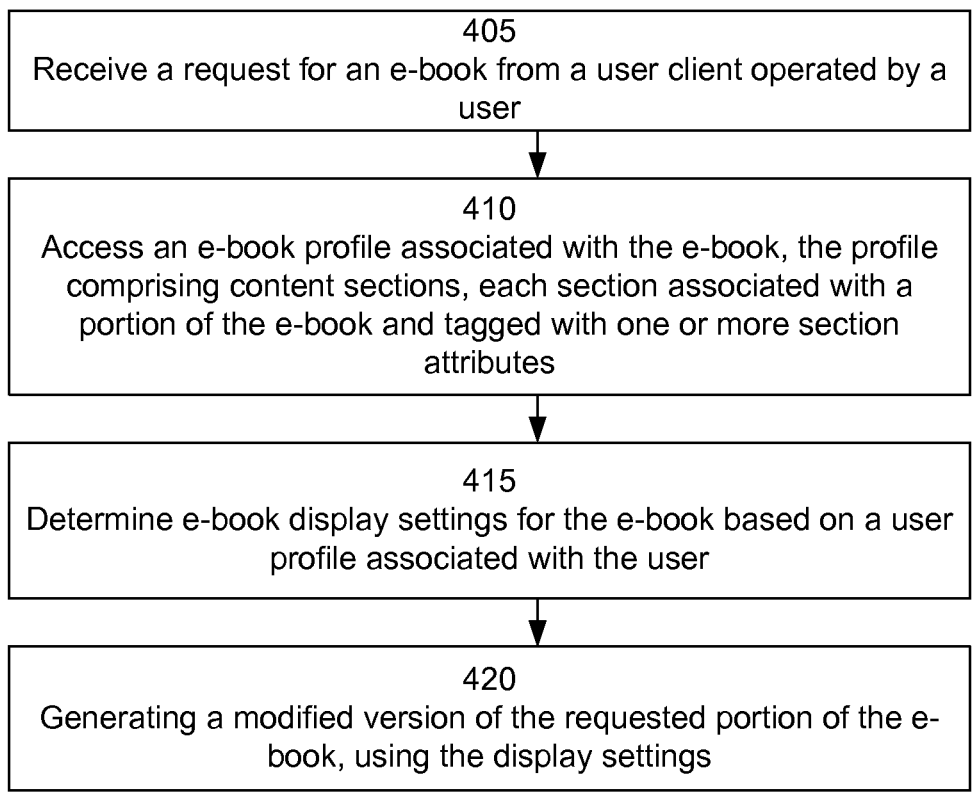
FIG. 4 is a flowchart illustrating a method for displaying a customized version of an e-book to a user operating a user client according to one embodiment.

FIG. 4 is a flowchart illustrating a process for displaying a customized version of an e-book to a user operating a user client 100 according to one embodiment. In the illustrated process a request is first received 405 from a user client 100 for a portion of an e-book. The request may have been generated by an e-book reader 101 executing on the user client 100, in response to a user selecting an e-book. An e-book profile associated with the e-book is then accessed 410. The e-book profile, as described above, includes information about a plurality of content sections for that e-book, where each content section is associated with a portion of the e-book. Each content section may have one or more section attributes.

Display settings are then determined 415 based on a user profile associated with the user and the e-book profile of the e-book. The user profile includes information such as the reading preferences of the user, demographic information about the user, etc. The display settings comprise instructions indicating how the portions of the e-book referenced by each content section should be transformed. In one embodiment the display settings comprise section transformations describing transformations that may be applied to content sections, and target attributes that indicate the section attributes of the content sections where the transformations should be applied. The transformations include operations such as hiding, scaling, substituting, highlighting, etc. For example, an e-book profile for an e-book may contain several content sections referencing different portions of the e-book. Some of these content sections may have section attributes that indicate "violent content." Based on the user's user profile, the e-book view manager 107 may determine that violent content is inappropriate for the user. Based on that assessment display settings may be generated for the user indicating that violent content sections should be hidden or replaced with substitute text, when displaying the e-book on the user client 100. The display settings may also comprise section transformations directly associated with section references.

A modified version of the requested portion of the e-book is then generated 420 for the user. In one embodiment generating the modified version of the e-book comprises sending the display settings to the user client 100, where they will be used to transform the e-book before display to the user. In another embodiment generating the modified version of the e-book comprises transforming the e-book at the EMS 104, and sending the transformed e-book to the user client 100 for display.

In one implementation the content section information (including the section attribute and/or section reference information) for an e-book is sent to the user client 100 along with the display settings. In this implementation the content section information may be part of the display settings, or it may be sent separately. In another implementation, the content section information is included with the e-book data and may be stored in the e-book database 105. In one implementation e-book data associated with the requested portion of the e-book may also be sent to the user client 100 from the EMS 104. In an alternative implementation a location for the e-book may be sent to the user client 100 instead. If the content section information is not included in the display settings, it may be sent to the user client 100 separately, or it may be included in the e-book data.

In one implementation, the client communication module 102 of the user client 100 receives both the e-book and the display settings. In this implementation, the display settings are used by the e-book reader 101 executing on the user client 100 to determine how to display the requested portion of the e-book. For example, based on the display settings in the example above, the e-book reader 101, when displaying the e-book, may hide the content sections of the e-book that have section attributes indicating "violent content."

In another implementation the client communication module 102 of the user client 100 receives a transformed version of the e-book which has been customized based on the display settings by the EMS 104. In this implementation the e-book reader 101 executing on the user client 100 may display the transformed e-book.

In situations in which the systems discussed here collect personal information about users, or may make use of personal information, the users may be provided with an opportunity to control whether programs or features collect user information, or to control whether and/or how to receive content from the EMS 104 that may be more relevant to the user. In addition, certain data may be treated in one or more ways before it is stored or used, so that personally identifiable information is removed. For example, a user's identity may be treated so that no personally identifiable information can be determined for the user. Thus, the user may have control over how information is collected about the user and used by the EMS 104.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for generating custom views of e-books based on user data. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

The invention claimed is:

1. A computer-implemented method for displaying a customized version of an e-book on a user client, comprising:
   receiving a request for a portion of an e-book from the user client operated by a user, the portion including a plurality of content sections;
   accessing a user profile for the user, the user profile describing the reading preferences of the user;
   retrieving, from an e-book profile associated with the e-book, content section information describing one or more section attributes of one or more content sections from the plurality of content sections;
   determining e-book display settings for the requested portion of the e-book based on the user profile, the e-book display settings comprising instructions indicating how to transform the requested portion of the e-book for the user, wherein determining the e-book display settings comprises:
      determining a section transformation, the section transformation describing one or more transformations that may be applied to content;
      determining target attributes associated with the section transformation; and
      generating instructions indicating to apply a transform described by the determined section transformation to content having the determined target attributes; and
   sending the content section information and the e-book display settings to the user client, wherein the user client is adapted to transform the requested portion of the e-book according to the instructions in the display settings to generate a modified version of the requested portion of the e-book by identifying, based on the content section information, a content section from the plurality of content sections that has a section attribute indicated by the determined target attributes and applying the transform described by the determined section transformation to the identified content section of the requested portion of the e-book.

2. The computer-implemented method of claim 1, wherein determining the section transformation further comprises selecting a transformation from the group comprising: hiding a section of the e-book, highlighting a section of the e-book, substituting a section of the e-book, and scaling a section of the e-book.

3. The computer-implemented method of claim 1, further comprising:
   identifying a content section from the plurality of content sections based on formatting information in the e-book; and
   determining a section attribute of the identified content section by applying one or more of the group comprising natural language processing, machine-learned classification, and sentiment analysis.

4. The computer-implemented method of claim 1, further comprising:
   sending the requested portion of the e-book to the user client.

5. The computer-implemented method of claim 1, further comprising:
   determining the one or more section attributes of the one or more content sections based on activities of social connections of the user, the activities associated with the e-book.

6. A non-transitory computer-readable storage medium storing executable computer program instructions, the instructions executable to perform steps comprising:
   receiving a request for a portion of an e-book from the user client operated by a user, the portion including a plurality of content sections;
   accessing a user profile for the user, the user profile describing the reading preferences of the user;
   retrieving, from an e-book profile associated with the e-book, content section information describing one or more section attributes of one or more content sections from the plurality of content sections;
   determining e-book display settings for the requested portion of the e-book based on the user profile, the e-book display settings comprising instructions indicating how to transform the requested portion of the e-book for the user, wherein determining the e-book display settings comprises:
      determining a section transformation, the section transformation describing one or more transformations that may be applied to content;
      determining target attributes associated with the section transformation; and
      generating instructions indicating to apply a transform described by the determined section transformation to content having the determined target attributes; and
   sending the content section information and the e-book display settings to the user client, wherein the user client is adapted to transform the requested portion of the e-book according to the instructions in the display settings to generate a modified version of the requested portion of the e-book by identifying, based on the content section information, a content section from the plurality of content sections that has a section attribute indicated by the determined target attributes and applying the transform described by the determined section transformation to the identified content section of the requested portion of the e-book.

7. The computer-readable medium of claim 6, wherein the instructions for determining the section transformation further comprise instructions for selecting a transformation from the group comprising: hiding a section of the e-book, highlighting a section of the e-book, substituting a section of the e-book, and scaling a section of the e-book.

8. The computer-readable medium of claim 6, further comprising instructions for:
   identifying a content section from the plurality of content sections based on formatting information in the e-book; and
   determining a section attribute of the identified content section by applying one or more of the group comprising natural language processing, machine-learned classification, and sentiment analysis.

9. A system comprising:
   a non-transitory computer-readable storage medium storing executable computer program instructions, the instructions executable to perform steps comprising:
      receiving a request for a portion of an e-book from the user client operated by a user, the portion including a plurality of content sections;
      accessing a user profile for the user, the user profile describing the reading preferences of the user;
      retrieving, from an e-book profile associated with the e-book, content section information describing one or more section attributes of one or more content sections from the plurality of content sections;

determining e-book display settings for the requested portion of the e-book based on the user profile, the e-book display settings comprising instructions indicating how to transform the requested portion of the e-book for the user, wherein determining the e-book display settings comprises:
  determining a section transformation, the section transformation describing one or more transformations that may be applied to content;
  determining target attributes associated with the section transformation; and
  generating instructions indicating to apply a transform described by the determined section transformation to content having the determined target attributes; and
sending the content section information and the e-book display settings to the user client, wherein the user client is adapted to transform the requested portion of the e-book according to the instructions in the display settings to generate a modified version of the requested portion of the e-book by identifying, based on the content section information, a content section from the plurality of content sections that has a section attribute indicated by the determined target attributes and applying the transform described by the determined section transformation to the identified content section of the requested portion of the e-book; and
a processor for executing the computer program instructions.

10. The system of claim 9, wherein the instructions for determining the section transformation further comprise instructions for selecting a transformation from the group comprising: hiding a section of the e-book, highlighting a section of the e-book, substituting a section of the e-book, and scaling a section of the e-book.

11. The system of claim 9, further comprising instructions for:
  identifying a content section from the plurality of content sections based on formatting information in the e-book; and
  determining a section attribute of the identified content section by applying one or more of the group comprising natural language processing, machine-learned classification, and sentiment analysis.

* * * * *